Figure 1:
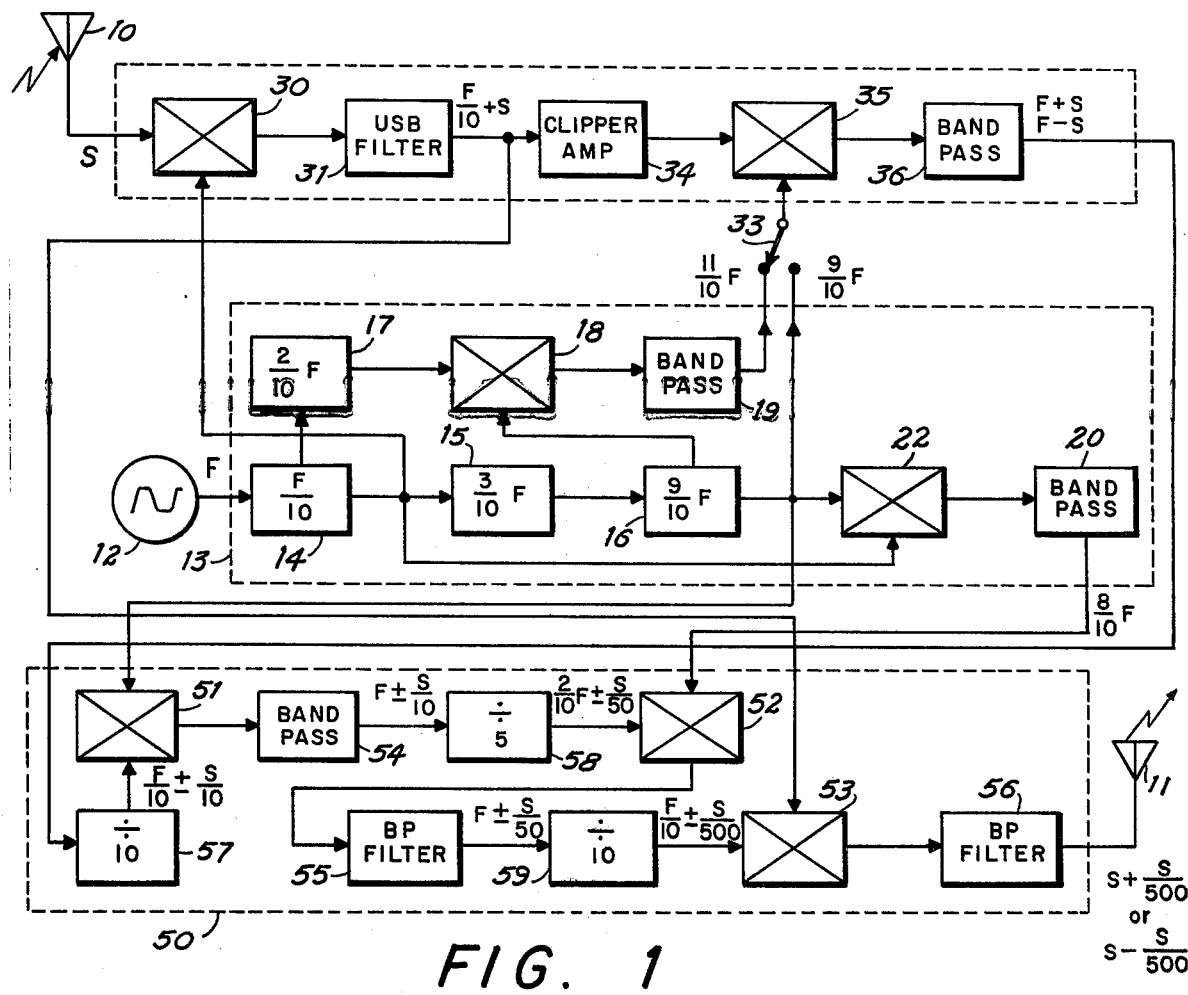

United States Patent [19]

Huisveld, Jr. et al.

[11] 3,921,121
[45] Nov. 18, 1975

[54] SELECTABLE UP OR DOWN DOPPLER SIMULATOR

[75] Inventors: Peter Huisveld, Jr., National City; Claude C. Routh, San Diego, both of Calif.; Milton D. Papineau, Kailua, Hawaii

[73] Assignee: The United States of America as represented by the Secretary of the Navy, Washington, D.C.

[22] Filed: June 12, 1964

[21] Appl. No.: 375,696

[52] U.S. Cl. .............. 340/3 E; 340/5 D; 343/6.5 R; 343/18 E
[51] Int. Cl.² ........................ G01S 9/66; G09B 9/00
[58] Field of Search .............. 340/5 D, 3 E; 343/6.8, 343/17.7, 18 E; 325/9, 10, 11

[56] References Cited
UNITED STATES PATENTS

| | | | |
|---|---|---|---|
| 2,882,394 | 4/1959 | Mortley | 325/11 X |
| 2,935,701 | 5/1960 | Robinson et al. | 343/17.7 X |

FOREIGN PATENTS OR APPLICATIONS

| | | | |
|---|---|---|---|
| 946,481 | 12/1948 | France | 325/11 |

Primary Examiner—Richard A. Farley
Attorney, Agent, or Firm—R. S. Sciascia; G. J. Rubens

EXEMPLARY CLAIM

1. A doppler decoy for receiving a signal S and repeating the signal with a doppler frequency shift of $S/K$ comprising,
   a local generator of frequency $F$,
   a matrix of frequency multipliers and dividers coupled to said generator for generating and isolating selected decimal fractions of said $F$,
   a first modulator for combining said signal $S$ with a first relatively small decimal fraction of F,
   a second modulator for combining the products of said first modulator selectively with second and third relatively large decimal fractions equally above and below said $F$ to produce the sum and difference products, $F + S$ and $F - S$,
   a multiplier-divider logic circuit for successively mixing said $F + S$ and $F - S$ products with said decimal fractions of $F$ and for selecting the side band components of the mixing operations to yield a divided product containing said small fraction of $F$ as well as said $S/K$, and
   means for finally combining the divided products with the output of said first modulator to cancel all fraction of said frequency F, to yield an output signal $S \pm S/K$.

3 Claims, 2 Drawing Figures

U.S. Patent  Nov. 18, 1975  3,921,121

INVENTORS
PETER (NMI) HUISVELD
CLAUDE C. ROUTH
BY  MILTON D. PAPINEAU

ATTORNEYS

SELECTABLE UP OR DOWN DOPPLER SIMULATOR

The invention described herein may be manufactured and used by or for the Government of the United States of America for governmental purposes without the payment or any royalties thereon or therefor. This invention relates to repeaters of the type which can receive, amplify and re-radiate a signal, and is particularly directed to repeaters which can slighlty modify the frequency of the received signal before re-radiation to simulate doppler frequency shift.

The repeaters of the type considered here have military significance in that they have uses primarily in connection with anti-submarine warfare tactics. To confuse enemy sonar it is tactically advantageous to set up anchored buoys which will receive any sonar signal of frequency, $S$, regardless of the frequency, and will then shift the frequency up or down a small fixed percentage of the received frequency to give to the enemy sonar the appearance of either an approaching or a receding target vessel.

The object of this invention is to provide means for simulating a moving object in the sea.

The doppler decoy system of this invention comprises means for receiving signal, $S$, and means for modifying the siganl by a doppler shift frequency, $S/K$, where $K$ is a relatively large numerical constant, and means for re-transmitting said signal. The re-transmitted signal then will comprise $S + S/K$ for up-doppler frequencies or $S - S/K$ for down-doppler frequencies. The system dealt with here comprises a local generator of frequency $F$, where $F$ is much higher than the signal frequency $S$, and a matrix of frequency-changing elements for generating various decimal fractions of $F$. It is contemplated that the sonar signal to be received is acoustic and is in the sonic or supersonic ranges, while the locally generated frequency $F$ is in the radio frequency range, such as five megacycles. Modulators are employed for, selectively, combining either of two of the decimal fractions of $F$ with said signal $S$ for generating upper and lower sideband components, $F + S$ and $F - S$, respectively. Finally, means is provided for multiplying said sideband components with said decimal fractions to cancel the $F$ factor at the output and to add the $S/K$ factor to $S$.

Figure 2:
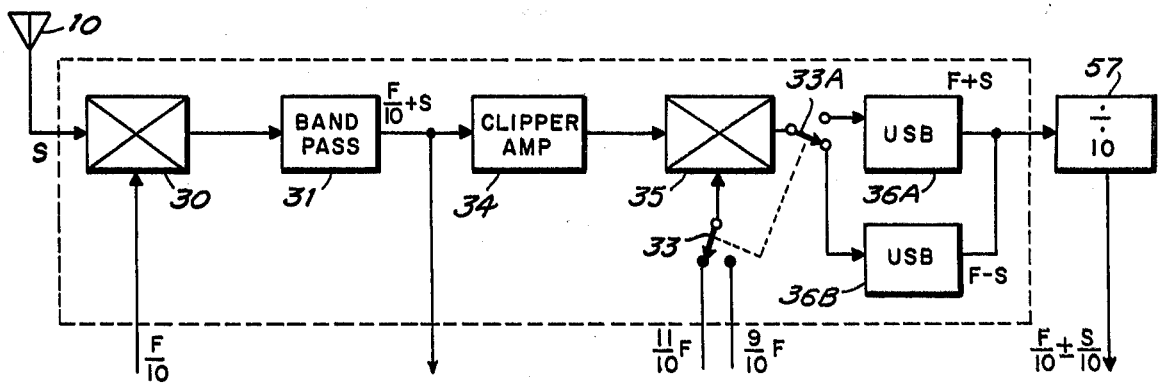

Many features and objects will occur to those skilled in the art by referring to the specific embodiments described in the following specification and shown in the accompanying drawings in which:

FIG. 1 is a block diagram of the principal elements of one up-down doppler simulator according to this invention; and FIG. 2 is a modification of one portion of the system shown in FIG. 1.

Signals $S$ are received at the transducer 10, are modified in the system of FIG. 1 and are re-transmitted from transducer 11 as $S + S/K$ or $S - S/K$. The two position switch 33 selects either the up or the down doppler shift. Local generator 12 generates frequency $F$. The generated frequency is preferably an oscillatory wave rich in harmonics so that decimal fractions of the frequency $F$ may be readily obtained by filtering or other well known techniques. The matrix 13 of multipliers and dividers provide the desired decimal fractions of $F$. In the particular matrix shown the divider 14 filters out the $F/10$ component, while multipliers 15 and 16 provide $3F/10$ and $9F/10$, respectively. The output of divider 14 is also fed into the multiplier 17 for obtaining the $2F/10$ components. By adding $2F/10$ to $9F/10$ in the mixer modulator 18, the $11F/10$ factor may be obtained in the bandpass filter 19. On the other hand, mixer-modulator 22 combines $9F/10$ with $F/10$ to obtain through bandpass filter 20 the factor $8F/10$. Hence, in the specific embodiment shown, the decimal fractions of $F$ which are coupled out of the matrix 13 for use elsewhere are $1/10$, $8/10$, $9/10$ and $11/10$. Other combinations of matrix components may be employed to derive other fractions, should the systems so require. Any suppressed-carrier or ring type modulator may be employed in the system of FIG. 1 where the frequency components fed into the mixer are canceled and only the sum and difference components are found in the output circuits. The bandpass filters are used in the usual way for selecting either the upper or lower sideband at the output of the mixer.

In FIG. 1 the incoming signal $S$ is mixed with $F/10$ in mixer 30, and the upper sideband, $F/10 + S$, is selected by filter 31. The selected band is leveled in amplitude by the clipper amplifier 34 and is fed into the mixer 35 where it is mixed with either of the two decimal fraction components equally above and below $F$. In the example shown these two fractions are $9F/10$ and $11F/10$ which are applied, respectively, to the two switch points of switch 33. By manipulating switch 33, either of two products can be obtained at the output of mixer 35. First, $11F/10 - (F/10 + S)$ will yield $F - S$. On the other hand, the other position of the switch $9F/10 + (F/10 + S)$ will yield $F + S$. Bandpass filter 36 is broad enough to pass either of the two selected components, yet sharp enough to attenuate adjacent fractions, such as $8F/10$ and $12F/10$. As will appear below, the $F/10 + S$ output of filter 31 is used elsewhere in the system.

Alternatively, the upper sideband component, $F + S$, and the lower sideband component, $F - S$, may be obtained and separated in the slightly different arrangement of FIG. 2. Here, the component $F/10 + S$ is selected from the output of the mixer 30 by filter 31 and is applied through clipper amplifier 34 to the mixer 35 where $F/10 + S$ is added either to $11F/10$ or subtracted from $9F/10$, as selected by switch 33. The two resulting sideband components are selected respectively, by the relatively narrow upper and lower sideband filters 36A and 36B. The outputs of the two filters are, respectively, $F + S$ and $F - S$, and the filters are selected by switch 33A, interlocked with switch 33.

According to FIG. 1 of this invention the two sideband components $F + S$ and $F - S$ are operated upon in the multiplier-divider logic circuit 50 to eliminate the $F$ factor and to add $S/K$ to the $S$ factor to produce at the output transducer 11 the two doppler shifted frequencies $S + S/K$ and $S - S/K$. In the specific logic circuit shown, $K$ is 500. Each of the cascaded mixers 51, 52 and 53 are followed, respectively, by bandpass filters 54, 55 and 56. Mixers 51, and 52 receive, respectively, the decimal fractions $9/10F$ and $8/10F$ from the factoring matrix 13, while mixer 53 receives $F/10 + S$ from the output of the bandpass filter 31. It is significant that the $F/10 + S$ is obtained ahead of the clipper amplifier 34 and is injected into the final mixer 53 so that the ultimate output of the system retains the amplitude information of the incoming signal $S$. The logic circuit 50 additionally contains the dividers 57, 58 and 59 which divide the inputs, respectively, by factors 10, 5 and 10. The total division, hence, is 500. Reading the logic circuit 50 from left to right in FIG. 1, the divider 57 yields $F/10 \pm S/10$. Mixer 51 combines the output of divider 57 with $9F/10$ to yield $F \pm S/10$. Further division by 5 in divider 58 increases the denominators, as shown, and the addition, then of the $8F/10$ yields $F \pm S/50$ in the output of bandpass filter 55. Final division by divider 59 produces $F/10 \pm S/500$. $S/500$ is a sufficiently small doppler shift frequency for most purposes. It is apparent that the value of $K$ can be increased or decreased as desired by more or less dividers. Now, the $F$ factor is eliminated and the $S$ factor is introduced by injecting $F/10 + S$ from the output of filter 31 to the input of mixer 53. Simple addition yields $S + S/500$ and $S - S/500$, the results desired.

Before launching the buoy containing the doppler repeater of this invention, the switch 33 is set to produce either the up-doppler or the down-doppler frequencies at the output transducer 11. Enemy ships ensonifying the water containing this buoy will receive doppler shifted frequencies in reply which indicates to the enemy sonar either an approaching or a receding vessel. If desired, the switch 33 may be periodically shifted from up-doppler to down-doppler and vice versa by a clock driven mechanism.

Many modifications may be made in the details of the repeater of this invention without departing from the scope of the appended claims.

What is claimed is:

1. A doppler decoy for receiving a signal $S$ and repeating the signal with a doppler frequency shift of $S/K$ comprising,
    a local generator of frequency $F$,
    a matrix of frequency multipliers and dividers coupled to said generator for generating and isolating selected decimal fractions of said $F$,
    a first modulator for combining said signal $S$ with a first relatively small decimal fraction of $F$,
    a second modulator for combining the products of said first modulator selectively with second and third relatively large decimal fractions equally above and below said $F$ to produce the sum and difference products, $F + S$ and $F - S$,
    a multiplier-divider logic circuit for successively mixing said $F + S$ and $F - S$ products with said decimal fractions of $F$ and for selecting the side band components of the mixing operations to yield a divided product containing said small fraction of $F$ as well as said $S/K$, and
    means for finally combining the divided products with the output of said first modulator to cancel all fraction of said frequency $F$, to yield an output signal $S \pm S/K$.

2. The system defined in claim 1 further comprising, a switch for selectively applying to said second modulator one or the other of said relatively large decimal fractions from said matrix to selectively produce either $F + S$ or $F - S$.

3. A doppler decoy for receiving a signal $S$ and repeating the signal with a doppler frequency shift of $S/K$ comprising,
    a local generator of frequency $F$,
    a matrix of frequency multipliers and dividers coupled to said generator for generating and isolating selected decimal fractions of said $F$,
    a first modulator for combining said signal $S$ with a relatively small decimal fraction of $F$,
    a filter coupled to the output of said first modulator for selecting one sideband,
    a second modulator coupled to said filter for combining the selected sideband with a relatively large decimal fraction the sum of said small and large decimal fractions being equal to $F$ to yield a product at the output of said second modulator comprising $F$ and $S$, and
    a multiplier-divider-logic circuit coupled to said matrix and to the output of said first and second modulators, said logic circuits comprising a plurality of groups of elements, the elements in each group consisting of a divider, a mixer and a bandpass filter connected in cascade, the input end of the groups of elements being connected in receive the $F$ and $S$ signal from the output of said second modulator, the first and second mixers being connected, respectively, to two sources of relatively large decimal fractions of $F$ in said matrix, the dividing factors and pass band frequencies of the elements of the first two of said groups being adjusted to produce a signal containing $S/K$ and said small fraction of $F$, and
    means for adding to said signal in the third mixer the output of said first modulator, the third filter being adjusted to select $S \pm S/K$.

* * * * *